United States Patent

[11] 3,593,335

[72] Inventors Harold O. Wires;
 Samuel E. Rickly, both of Columbus, Ohio
[21] Appl. No 825,349
[22] Filed May 16, 1969
[45] Patented July 13, 1971
[73] Assignee The United States of America as represented by the Secretary of the Interior

[54] PARTIAL-RANGE TRACKING INDICATOR
 7 Claims, 3 Drawing Figs.
[52] U.S. Cl. ................................................ 340/177,
 116/124, 340/282
[51] Int. Cl. ................................................ G01d 5/04
[50] Field of Search ...................................... 340/177,
 179, 282; 116/124; 73/215; 346/65, 66, 70;
 74/424.8; 222/41; 61/28

[56] References Cited
UNITED STATES PATENTS
1,234,021  7/1917  Harrington et al. ........... 116/124
2,891,239  6/1959  Parsons ........................ 340/177
3,405,388  10/1968 Byrne ........................... 340/282

Primary Examiner—John W. Caldwell
Assistant Examiner—R. J. Mooney
Attorneys—Ernest S. Cohen and Gersten Sadowsky ABSTRACT: A first mechanical system monitors the total displacement of an element within an input device. A second mechanical system monitors only a critical increment of that displacement. The first system activates and deactivates the second system at the boundary of the critical increment. The second system operates an electromechanical readout transducer. In this way the readout resolution of the transducer is increased for the displacement increment of critical concern.

PATENTED JUL 13 1971

INVENTORS
HAROLD O. WIRES
SAMUEL E. RICKLY

BY Gersten Sadowsky
ATTORNEY

PARTIAL-RANGE TRACKING INDICATOR

BACKGROUND OF THE INVENTION

This invention generally concerns tracking indicators, and more particularly a tracking indicator which transduces the displacement of an element into representative electrical signal for only a selected part, or fraction, of a larger total displacement of the element, while at the same time mechanically monitoring the total displacement.

In monitoring the displacement of an element, a small increment of the displacement is often of critical concern, while the remaining displacement is of lesser consequence. For example, when graphically recording the opening and closing of a gate in a dam, the initial increment of displacement of the gate yields the most important displacement information. When the entire range of opening of the gate is recorded, the resolution of the initial increment is decreased because the largest part of the available space on the graph is taken up by unnecessary displacement information. By recording only the displacement increment of critical concern, the entire width of the graph is used for that increment, and the readout resolution for the increment increased appreciably.

When a selected increment of a total larger displacement of a dam gate is recorded, the accuracy of the record depends upon a precise determination of the entry into, and exit from that increment by the gate. Otherwise the boundaries of the increment are not accurately determined, and the record is ambiguous. In order to precisely determine the boundary of the increment as the gate is first opened and then closed, the entire range of displacement is monitored in addition to the partial range. Then, as the gate enters into and exits from the selected increment a recorder is activated or deactivated, respectively.

SUMMARY OF THE INVENTION

This invention is a partial range tracking indicator for monitoring a selected increment out of a larger total displacement of an element. In the tracking indicator a threaded collar is translated along a threaded rod by rotating the collar in proportion to the displacement of an element in an input device. The position of the collar upon the rod represents the displacement position of the element in the input device.

A transition gear is biased by one coil spring for translation with the collar along the threaded rod, and is driven by another coil spring for rotation along with the threaded collar. The rotation of the transition gear operates an electromechanical transducer which converts the mechanical displacement of the gear into an electrical analogue signal for operating a readout device. The rotation of the transition gear is proportional to the displacement of the element in the input device, and the electrical analogue signal represents the displacement of the element.

At a predetermined point, which point is at the boundary of the increment of critical concern in the translation of the collar and transition gear along the threaded rod, the transition gear encounters a rigid stop and ceases rotating and translating with the threaded collar. The operation of the electromechanical transducer by the transition gear similarly ceases. The threaded collar continues to rotate for monitoring the total displacement of the element in the input device.

When the displacement of the element in the input device reverses direction, the translation of the threaded collar similarly reverses direction. As the displacement of the element enters the increment of concern, the collar contacts the transition gear at the rigid stop and rotates the gear against the force of the coil spring, again operating the electromechanical transducer. In this way the incremental readout is synchronized with the total displacement of the element.

Therefore, it is an object of this invention to provide a tracking device for monitoring the total displacement of an element.

A further object of this invention is to provide a tracking device for monitoring the total range of displacement of an element, and for providing a readout indication for a partial range of the total displacement.

A further object of this invention is to provide a partial range tracking indicator which establishes the boundary between a total and a partial range of displacement with repetitive accuracy.

These and other objects of this invention will become more fully apparent with reference to the following specification and drawing which describe the preferred embodiment of the invention.

DETAILED DESCRIPTION OF THE INVENTION

Figure 1:
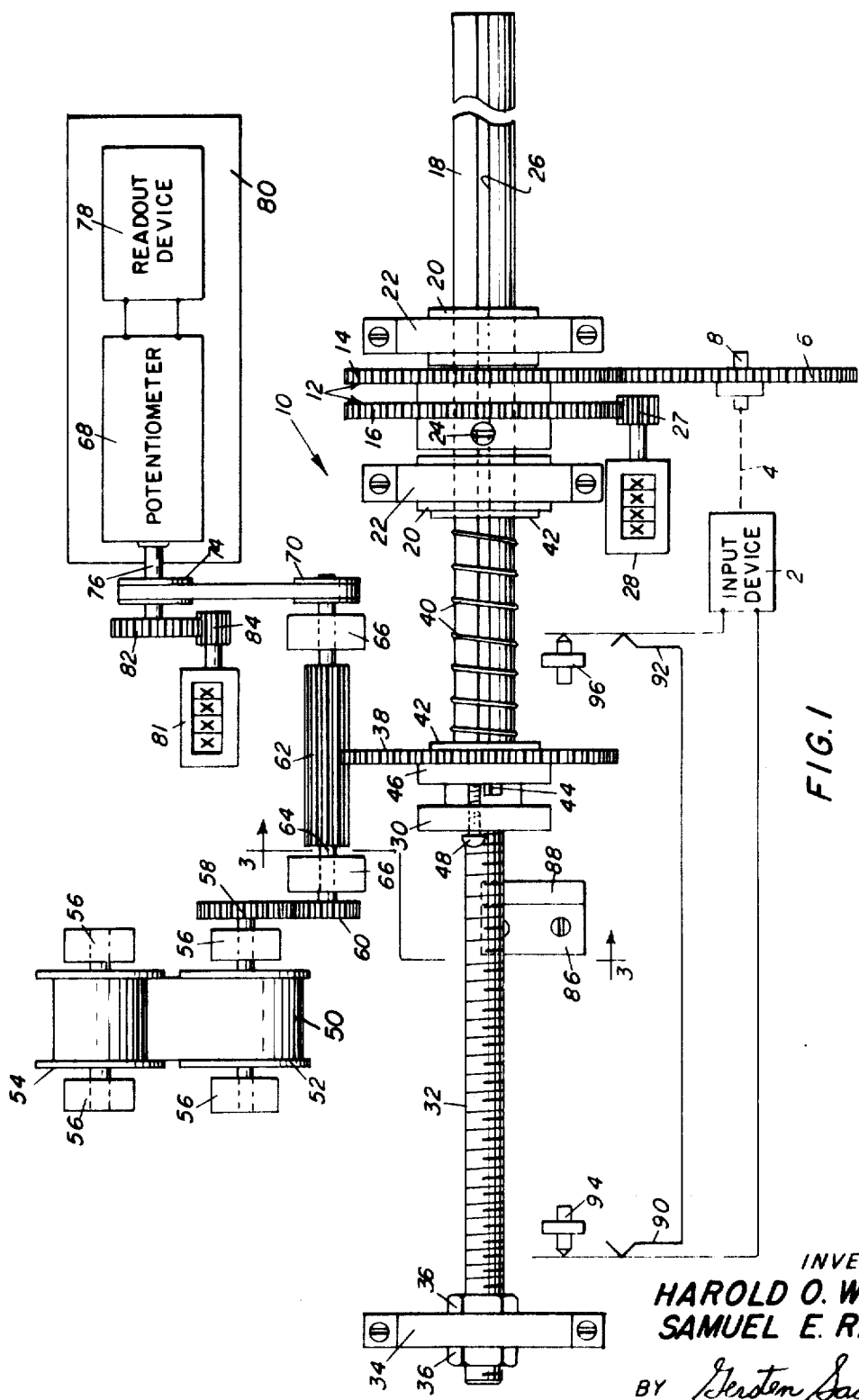
FIG. 1 is a plan view of a partial range tracking indicator.

In FIG. 1 an input device 2 is operatively connected through a mechanical linkage 4 to a driving gear 6, which rotates on a shaft 8. The input device 2 may be any device in which an element is operable over a range of positions, whether by rotational or translational displacement. As displacement of the element within the input device occurs, a proportional displacement stimulus is fed from the element, through the linkage 4 and gear 6, to a partial range tracking indicator 10. The tracking indicator 10, shown in FIGS. 1 and 2, monitors the displacement of the element within the input device 2, and provides an indication of a partial increment of that displacement. Once the partial increment of displacement is exceeded, the output indication of the tracking indicator 10 remains at a preset maximum, representative of that partial increment. When the displacement direction of the element within the input device 2 reverses, and the element returns toward its original position, the tracking indication again represents the actual position as the element passes the preset maximum indication position in the return path.

By discriminatively indicating only the partial increment of critical concern in the total displacement of the element in the input device 2, the partial range tracking indicator increases the readout resolution for that critical increment. The tracking indicator 10 employs an electromechanical transducer 68 which converts displacement information into an electrical analogue signal for operation of a recorder, or similar readout device 78.

The range of the transducer 68 is restricted by the physical limitations inherent in its construction. For measurement of a range of displacement, the transducer is driven between limit stops. As the limits upon the total measured displacement of the element in the input device 2 are increased, the fractional displacement of the transducer for each increment of that total displacement is decreased. Consequently, the resolution of the transducer 68 is inversely proportional to the total displacement measured. To avoid this decrease in resolution where the element traverses a large displacement, an increment of critical concern is selected in the total range of displacement, and the transducer is driven between its limits for that increment. In the tracking indicator shown in FIGS. 1—3, the increment selected for readout indication is the initial increment of displacement of the element. In addition, to insure repetitive activation and deactivation of the transducer at the precise boundary of the increment, the partial range tracking indicator 10 also monitors the entire range of displacement.

Referring to FIG. 1, the displacement of an element input device 2 is converted by a linkage 4 and a driving gear 6 to a rotational displacement of a double input gear 12 in the tracking indicator 10. The input gear 12 has parallel rows of teeth 14 and 16 which rotate in unison with a hollow shaft 18.

The hollow shaft 18 is supported for rotation and translation within bearings 20 on pillow blocks 22. A fastener 24 on gear 12 rides freely within a key way 26 which extends longitudinally on the shaft 18 between each end of the shaft. The fastener 24 effectively couples the gear 12 to the hollow shaft 18 for simultaneous rotation of the gear and shaft, while permitting lateral displacement of the shaft within the gear. One set of gear teeth 14 engages the input gear 6 for rotating the shaft 18, while the other set engages another gear 27 for driving a digital rotation counter 28.

An internally threaded collar 30 is fixed concentrically to one end of the hollow shaft 18, and one end of a threaded rod 32 is threaded within the collar. The other end of the threaded rod 32 is fastened to a pillow block 34 by a pair of nuts 36, so that the rod is rigidly fixed in concentric alignment with the hollow shaft 18. As the hollow shaft 18 is rotated in a counter clockwise direction by input gear 12, (viewed from the collar end of the shaft), threaded collar 30 rotates, and the screw threads on collar 30 and rod 32 draw the collar and shaft along the rod in the direction to the fixed end of the rod. As the shaft 18 translates along the rod 32, the rod extends into the hollow space within the shaft. When the hollow shaft 18 is rotated in a clockwise direction, the shaft translates away from the fixed end of the rod.

The position of the threaded collar 30 upon the rod 32 is directly related to the amount of rotation of input gear 12. Similarly, the amount of rotation of the input gear 12 is directly related to the displacement of the element in input device 2. Therefore, the position of the collar 30 on the rod 32, with respect to a fixed datum, is directly related to the total displacement of the element in the input device. The collar 30 follows the displacement of the element in the input device for monitoring the exit from, and entry of the element into, the increment of critical concern.

Figure 2:
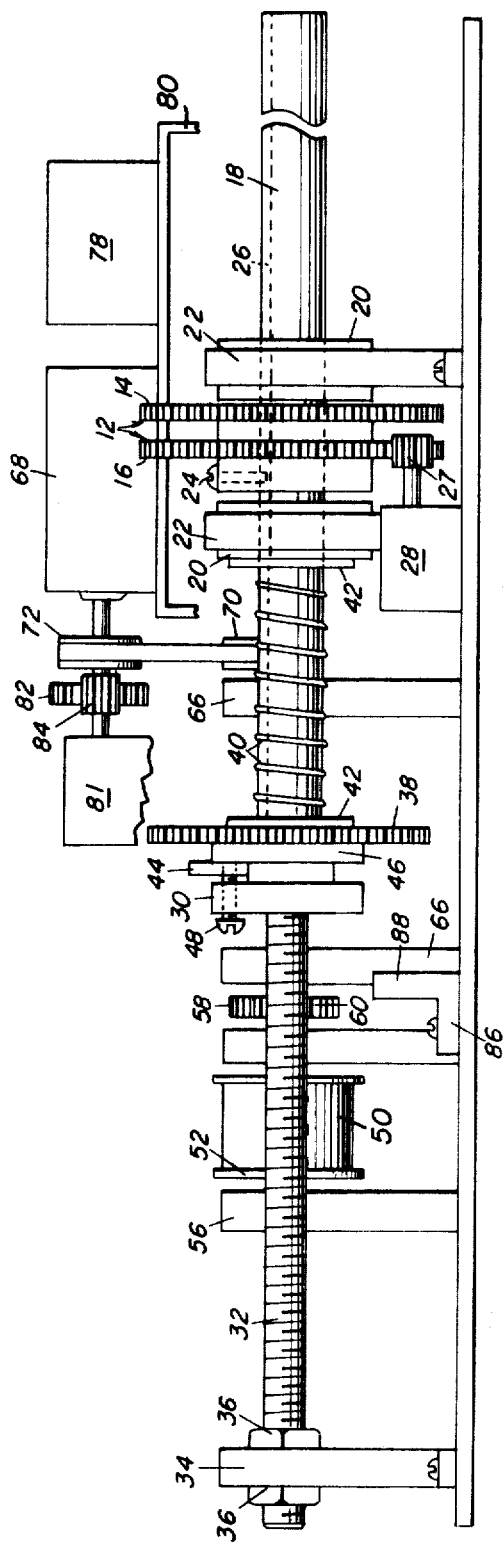
FIG. 2 is a side view of the partial range tracking indicator shown in FIG. 1.
Figure 3:
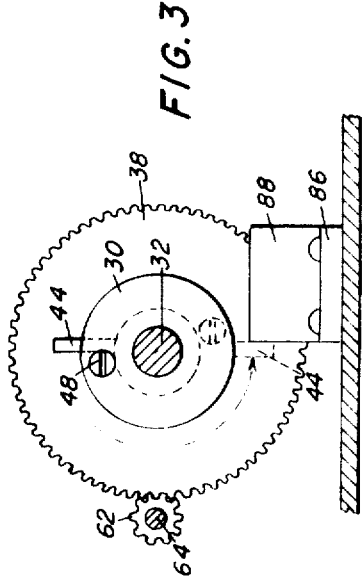
FIG. 3 is a side view of threaded collar and a transition gear shown in FIGS. 1 and 2, viewed along section lines 3–3 in FIG. 1.

A smooth bored transition gear 38 rotates and translates freely upon the shaft 18 adjacent to threaded collar 30. The transition gear 38 is biased in the direction of the collar by a coil spring 40 which extends between a pair of washers 42 on the shaft. A narrow detent bar 44, fixed to the gear 38, extends radially beyond the periphery of a collar 46 on one end of the gear 38, as best seen in FIGS. 2 and 3. The detent bar 44 cooperates with an adjustable detent 48, which extends through the collar 30 in the direction of the shaft 18, to synchronize the rotation of collar 30 with the rotation of the gear 38.

The detent 44 on the transition gear 38 is rotationally biased against the detent 48 on the collar 30 by the torque of a coil spring 50. The torque from spring 50 is transmitted to gear 38 and detent 44 through a train of gears. The constant torque spring 50 is wound in an S-shaped spiral on spools 52 and 54 which are mounted for rotation on pillow blocks 56. The spring 50 is secured at each end to a spool and tends to rewind onto spool 54. The spring supplies a constant counterclockwise torque (viewed from left to right in FIGS. 1 and 2) at an output gear 58. This torque is transmitted by a gear 60 to an elongated gear 62 which is mounted for rotation with a common shaft 64 between pillow blocks 66. The elongated gear 62 transmits a constant counterclockwise rotational torque to the transition gear 38, biasing the fixed detent 44 in a counterclockwise direction against the adjustable detent 48. When the collar 30 rotates in a counterclockwise direction, the transition gear 38 follows the rotation of the collar as the spring 50 rewinds onto spool 54. When the collar 30 rotates in a clockwise direction, the collar drives the transition gear 38 against the force of spring 50, and the spring 50 is wound onto spool 52.

The position of collar 30 along the threaded rod 32 represents displacement of the element within the input device 2. Since the transition gear 38 follows the collar 30, the position of the gear also represents displacement of the element. In addition, the amount of rotation of transition gear 38 is directly proportional to, and representative of the displacement of the element in the input device. In view of this rotational proportionality, the transition gear is employed to control an electromechanical potentiometer 68 for converting the displacement information transmitted by the gear 38 into an electrical analogue signal. Rotational displacement information is transferred from transition gear 38 to the potentiometer 68 through the elongated gear 62, a sprocket 70 on shaft 64, a positive drive belt 72, and a second sprocket 74 on input shaft 76 of the potentiometer. The output from the potentiometer is fed to a readout device 78, which may be a graphical recorder, for example, for permanently recording the displacement of the element within the input device. The potentiometer and readout device are each supported on a suitable base 80.

A digital rotation counter 81 is used to visually monitor the displacement input to the potentiometer 68. A gear 82 on the potentiometer shaft 76 engages a second gear 84 on the shaft of the counter 81, driving the counter whenever the potentiometer is driven. The ration of the gears driving the counter 81 is designed to synchronize the reading on the counter 81 with the reading on the other counter 28 for a given displacement input.

As increasing displacement of the element in input device 2 occurs, the collar 30 and transition gear 38 translate together along the threaded rod 32, while rotating in a counter-clockwise direction. Simultaneously, the transition gear feeds displacement information to the potentiometer 68. When a preselected increment of displacement has occurred, the transition gear 38 reaches a stop 86 which blocks further translation of the gear 38 along the rod 32. The detent bar 44 on the gear 38 strikes a side 88 of the stop 86 (as best seen in FIG. 3) preventing further rotation of the gear. The collar 30 then continues to rotate, advancing along the threaded rod 32. The pitch of the threaded rod 32 and the protrusion of the fixed detent bar 44 and adjustable detent screw 48 are chosen so that a single revolution advances collar 30, with adjustable detent 48, a distance sufficient to prevent further interference between the fixed and adjustable detents 44 and 48. The relatively movable collar 30 and transition gear 38, in cooperation with the stop 86, act as a clutch at the transition point between the incremental displacement of critical concern and the additional displacement within the input device. When the face of gear 38 strikes the stop 86 the smooth bored gear rides freely on shaft 18. Further displacement of the potentiometer 68 ceases, and the indication from readout device 78 shows only that the displacement has exceeded the increment of critical concern. At this point, the torque transmitted to transition gear 38 from spring 50 holds the detent 44 against the side 88 of stop 86, preventing fluctuation of the readout indication.

As the displacement of the element within the input device decreases, the collar rotates in a clockwise direction, engaging the transition gear 38 as the stop 86 is reached. Displacement information is again transmitted to the potentiometer, and the readout indication again represents the displacement within the input device 2. The synchronization of the transition of gear 38 from rest to rotation at the increment boundary is evidenced by comparing the readings of the rotation counters 28 and 81. The backlash in the gear train of the transition indicator 10 is held to a minimum, so that when the indicator is operating properly, the readings of the counters 28 and 81 are repetitively coincident below stop 86.

Since a displacement input beyond the physical capabilities of the partial range tracking indicator 10 would damage the component parts of the indicator, an electrical interlock with the input device 2 is provided. Limit switches 90 and 92, at the respective upper and lower limits of travel of collar 30, deactivate the power circuit of the input device when the collar engages linkages 94 and 96. Alternatively, switches 90 and 92 could be positioned along the path of collar 30 to actuate diverse controls as a function of displacement of the element within the input device.

In adapting the present exemplary disclosure to a particular tracking environment other modifications within the scope of the invention will become apparent to those skilled in the art in the light of the above teachings and within the scope of the appended claims.

What we claim is:

1. A partial range tracking indicator comprising:

first means responsive to the total range of displacement of an element in an input device for representing displacement in proportion to the total displacement of the element, an electromechanical transducer, second means responsive to a partial range of the total range of displacement of the element for operating the electromechanical transducer within the partial range, the first means being releasably coupled to the second means for dependent operation in the partial range of displacement, and independent operation outside of the partial range of displacement, and third means for uncoupling and coupling the first and second means as the partial range is exceeded and entered, respectively.

2. An apparatus as claimed in claim 1 in which:

the first means includes a threaded collar mounted for rotation and translation on a threaded shaft, the second means includes a smooth bored gear mounted for rotation and translation upon a shaft which is secured to the threaded collar, and the third means includes a detent on the threaded collar, a detent on the smooth bored gear, and a rigid stop which is fixed relative to the movement of the collar and the gear.

3. The apparatus as claimed in claim 2 in which:

the electromechanical transducer is driven by a source of motive power independent of the element, and the smooth bored gear operates the transducer by regulating the transmission of motive power from the source to the transducer.

4. The apparatus as claimed in claim 3 in which:

the source of motive power includes a coil spring.

5. The apparatus as claimed in claim 1 in which the electromechanical transducer is electrically connected to a readout indicator.

6. The apparatus claimed in claim 2 in which the electromechanical transducer is electrically connected to a readout indicator.

7. The apparatus as claimed in claim 4 in which the electromechanical transducer is electrically connected to a graphical recorder.